Sept. 8, 1953                    F. ERDELYI                2,651,224
APPARATUS FOR THE PRODUCTION OF SCREW
THREADS BY MEANS OF PRESSING ROLLERS
Filed Dec. 19, 1947                        3 Sheets-Sheet 1
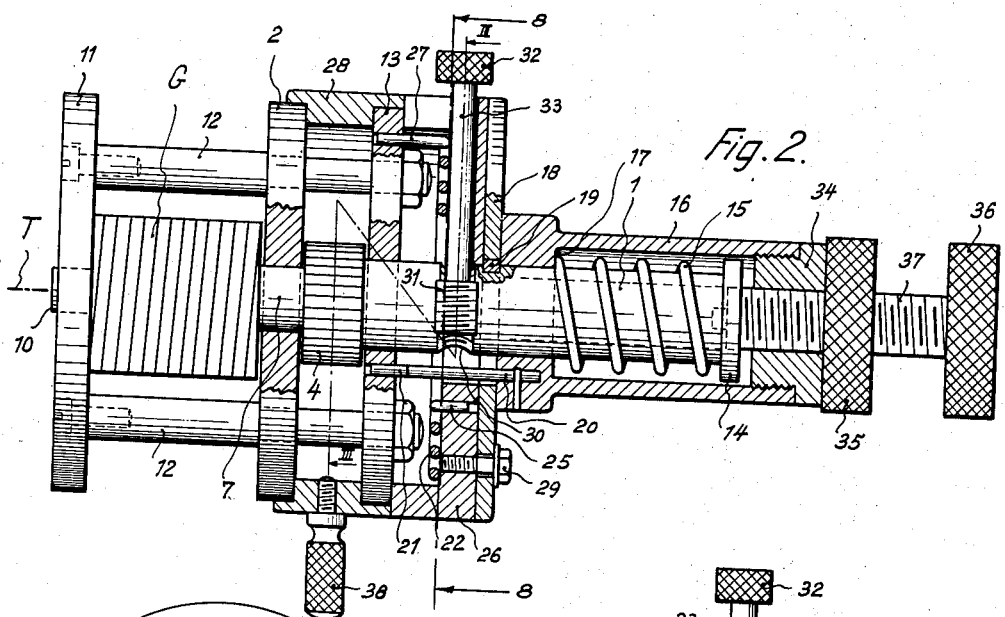
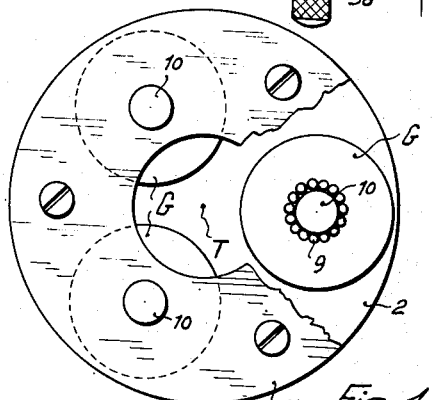
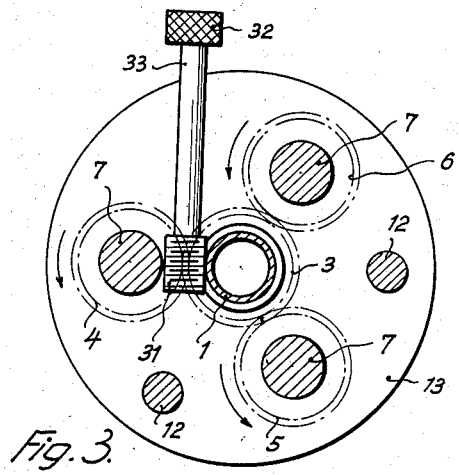
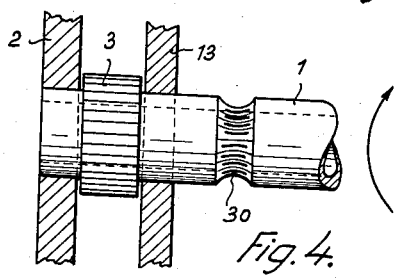
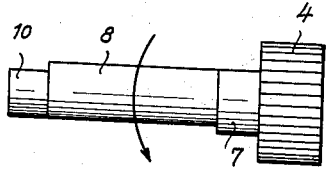
INVENTOR:
FERENC ERDÉLYI
BY Robert H. Jacob
HIS AGENT

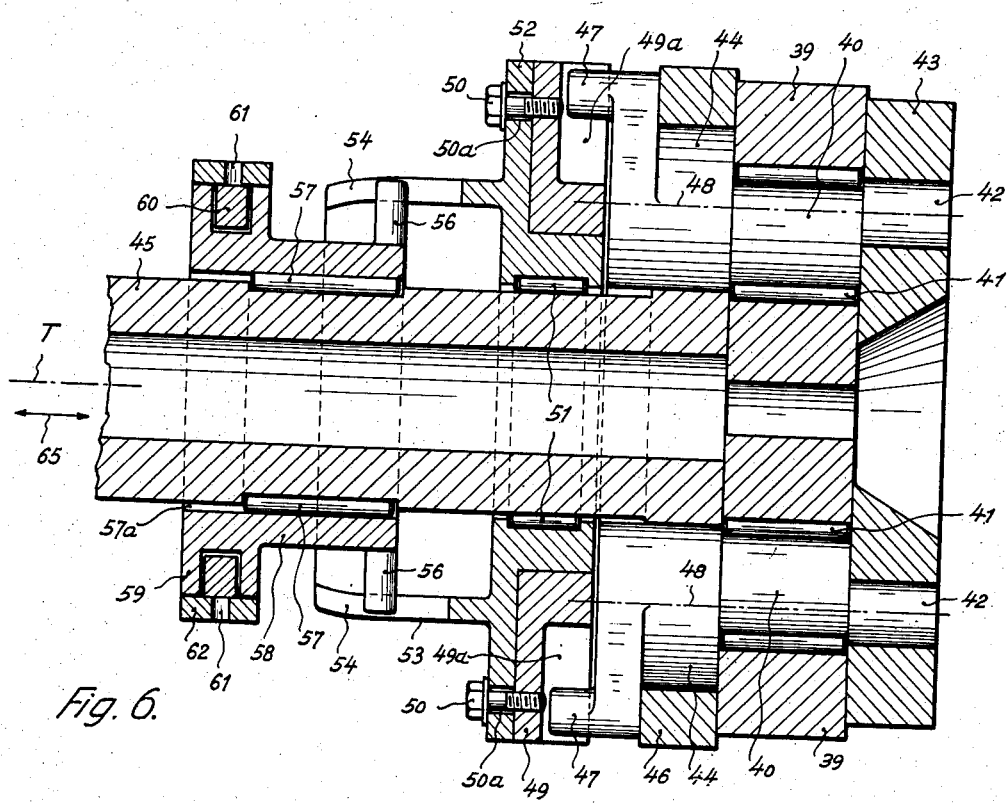

Patented Sept. 8, 1953

2,651,224

UNITED STATES PATENT OFFICE 2,651,224

APPARATUS FOR THE PRODUCTION OF SCREW THREADS BY MEANS OF PRESSING ROLLERS

Ferenc Erdélyi, Felsogod, Hungary, assignor to Wilhelm Fette Prazisionswerkzeug-Fabrik, Hamburg-Altona, Germany Application December 19, 1947, Serial No. 792,666
In Hungary December 23, 1946

2 Claims. (Cl. 80—6)

The invention relates to an arrangement for the production of screw threads, whereby the threads are pressed into the blank by means of rotating rollers in a manner known per se. It is the object of the invention to provide automatic means for displacing the thread rollers from the operative position upon completion of a screw thread of predetermined length, i. e. for the purpose of stopping the pressing operation to place the rollers into a position in which they do not touch the blank. In this manner it becomes unnecessary to stop the apparatus upon completion of the thread pressing operation, or to turn back the blank and the tools in opposite direction until the tools disengage the blank.

It is an object of the invention to provide means for the apparatus which operates with the thread rollers whereby the thread rollers are disengaged in accordance with the length of the screw thread. The disengagement is effected by the radial displacement of the thread rollers from the blank.

In accordance with the invention the thread rollers are disposed upon eccentric shafts, so that the radial displacement of the rollers can be effected by turning of the eccentric shafts of the rollers.

Various means can be employed for radially displacing the eccentric shafts which bear the rollers in accordance with the length of the finished thread. Two of these means are shown in the drawings as illustrative embodiments of the invention.

The principle of one of the embodiments consists of making the device of two parts, one of which carries the thread rollers and both of which are axially movable and rotatable relatively to one another within predetermined limits. In operation the two parts are connected with each other in such a manner that one of them transmits torque to the other. For this purpose a detent may be provided on each of the parts so that in operation, the two detents engage each other in a manner that one detent carries along the other and thus the part connected thereto. In addition, a spring is provided in the arrangement which, by rotation displaces the two said parts with respect to each other upon separation of the detents. This rotary movement is utilized for the displacement of the eccentric shafts of the thread rollers. The contact between the detents can be disengaged by axial movement of the two parts away from each other. For screws having a short thread the axial displacement of the two parts can be achieved, for example, in that on the part which does not carry the tools a stop is provided which cooperates with the blank. When the blank reaches that stop, the stop carries along that part of the device until the contact between the two cooperating detents is broken, whereupon the said spring displaces the two parts angularly with respect to one another so that the eccentric shafts are also angularly displaced.

In the production of long screw threads the stop which cooperates with the blank is disconnected and that part of the arrangement which can be displaced relatively to the part carrying the tools is fastened, for example, to the slide of a lathe and the travel of the slide is limited by a stop disposed at a distance corresponding to the length of the thread which is to be cut. When the slide reaches this stop, that part of the device which carries the rollers, is displaced axially with respect to the other part which has remained stationary with the slide until the contact between them is broken. Thereupon the shafts of the thread rollers are turned by said spring and displace the rollers radially away from one another.

In another embodiment of the invention the thread rollers journalled to eccentric shafts are radially displaced away from one another by a guiding member provided upon the shaft of the device which can be displaced axially, and which during this displacement is rotated by a guide bar. During this turning of the guide member the eccentric shafts of the rollers are rotated in such a manner by means of crank-like members that the rollers are shifted out of their operating position.

Two examples of the device in accordance with the invention are illustrated in the drawings.

Fig. 1 is a front elevational view and a partial cross section of the first embodiment;

Fig. 2 is a longitudinal section of the device;

Fig. 3 is a section taken along lines III—III of Fig. 2;

Fig. 4 is a detail of the device;

Fig. 5 is a view of the shaft of a thread roller with a gear forming a part thereof;

Fig. 6 is a longitudinal cross-section of the second embodiment of the invention;

Fig. 7 is a plan view of the embodiment shown in Fig. 6; and

Figure 8:
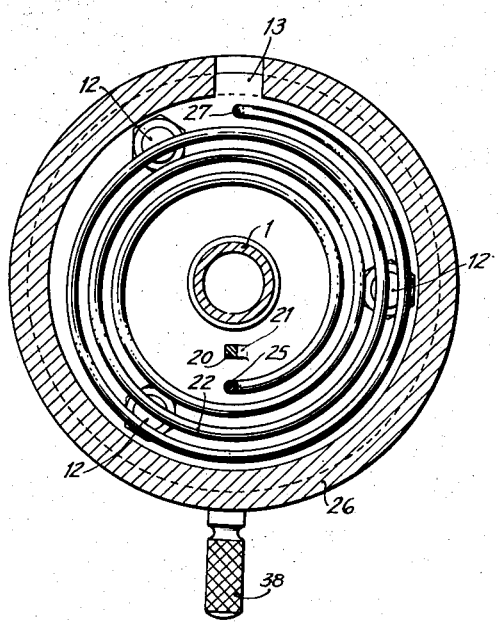
Fig. 8 is a cross-section taken along line 8—8 of Fig. 1.

The device according to Figs. 1 to 4 has a hollow shaft 1 the left end of which is supported in the disk 13. Supported upon the shaft is gearwheel 3 which is adapted to engage gear wheels 4, 5 and 6 of the three thread rollers G. Each thread roller is provided with ribs which are preferably in the form of helix. The gears 4, 5 and 6 are keyed to the ends 7 of the shafts 8 of the rollers G. Each roller has an eccentrically journalled shaft 8 (Fig. 5), which enables the approaching or removing of the rollers G with respect to one another by rotating shaft 8 by means of its gear wheel. Each thread roller G is supported upon its respective shaft by means of a ball bearing 9. The studs 10 of the shafts 8 are supported in corresponding bores in the disc 11. The disc 11 is connected to the disc 13 by bolts 12 which project through the disc 2.

The part of the device thus far described is stationary during operation except for the thread rollers which turn on the blank while their axes are stationary.

The problem is to automatically interrupt the process of operation upon completion of the predetermined length of thread.

For this purpose a flange 14 is provided at the right hand end of the hollow shaft 1 on which one end of the spring 15 is supported. The other end of spring 15 rests against sleeve 16 which is disposed around the shaft 1 and has an abutment 17 for the spring 15 in its interior. By virtue of this arrangement, compression spring 15 forces the sleeve 16 against disc 18. The disc 18, around the periphery of which graduations are provided for reasons set forth hereinafter, is keyed to the shaft 1 at 19. A detent 20 is provided in the sleeve 16 which projects through a slot in the disc 18 and rests against a counter-detent 21 on the disc 13. The described relative position of the parts mentioned is secured by the spring 22 provided inside of the device, one end of which, 25, is fastened to the disc 26 and the other end, 27 to the disc 13. The detents 20 and 21 overlap in the direction of the axis, so that in the position shown the tensional spring 22 forces the two detents 20 and 21 against each other. The disc 26 is rotatable relatively to the disc 13 or the ring 28 which holds together the discs 13 and 2 along their peripheries.

The disc 18 is fastened to disc 26 by means of bolt 29. Loosening bolt 29 permits rotating of disc 18 relatively to disc 26. A slot for bolt 29 is provided in disc 18 for this purpose.

The shaft 1 is provided with gear teeth 30 which mesh with worm wheel 31. Worm wheel 31 can be rotated by means of head 32 and spindle 33 which causes shaft 1 to be angularly displaced. The extent of this displacement can be read on the scale on disc 18 by means of an indicator on disc 26.

The right hand end of sleeve 16 is closed by a nut 34 against which rests a second nut 35 having a knurled periphery. The two nuts are arranged upon a spindle 37 which can be rotated by means of the head 36. The end of the spindle 37 projects into the bore of shaft 1.

The end of the spindle 37 which projects into the bore of the shaft 1 forms an abutment the distance of which from the rollers G can be adjusted by rotation of spindle 37. This abutment is adjusted in accordance with the length of the screw thread to be produced. After the blank in its progressive movement reaches the end of spindle 37 it carries along the sleeve 16 by way of nut 34. This compresses spring 15. Also detent 20 moves to the right with sleeve 16 until it leaves the right hand end of the counter-detent 21. At that moment spring 22 is released and it carries along the cage constituted of discs 11 and 13 and bolts 12. The cage thus rotates while shaft 1 and discs 18 and 26 remain stationary. During rotation of the cage the gear wheels 4, 5 and 6 of the rollers are turned by engagement with the gear wheel 3, thereby displacing the eccentric shaft of each roller. Consequently the thread cutting rollers G jump away radially of the axis of the shaft 1 and release the blank. Thus upon completion of a thread of predetermined length the thread cutting rollers open automatically thereby solving the initial problem.

Before a new blank is introduced it is necessary to return the tools to their operating position. Therefore, the cage formed intermediate the discs 11 and 13 is restored to the position shown in the drawings in which position the detents 20 and 21 again rest against each other. For that purpose ring 28 is provided with a handle 38. With the cage and the sleeve 16 in separated position, ring 28 and with it the roller carrying member are turned to the initial position whereupon the shell and the cage are approached to each other axially and the detents are placed adjacent each other. For this purpose detents 20 and 21 are preferably provided with sloping surfaces which, while in engagement with each other, compel the separation of the sleeve 16 and the cage.

If it is desired to change the distance of the rollers from the axis of the blank, bolt 29 is loosened and worm wheel 31 is turned by means of head 32 until the scale on disc 18 indicates the position, corresponding to the new setting, whereupon the bolt 29 is again tightened.

For operating the device in the foregoing manner the device is preferably supported in stationary position in a lathe by securing the sleeve 16 therein.

In accordance with the method described it is possible to produce only relatively short threads corresponding in length to shaft 1. The arrangement in accordance with the invention, however, is suitable for the production of substantially longer screws, or rather of screws of any desired length. For the purpose of producing threads of any desired length the abutment 37 is first removed, i. e. the nut 34 is unscrewed from the sleeve 16. Since the right end of the shaft 1 is also open now, blanks of any desired length can be passed through the shaft. Thereupon the device is fastened in the slide of a lathe, preferably lengthwise of the sleeve 16, and the travel of the slide is limited on the lathe to a distance corresponding to the length of thread which is to be produced. When upon completion of the operation the slide arives at the stop it ceases to move. However, since the tools G continue to rotate, they move along the thread and pull that part of the device which consists of the elements 11, 12, 2, 26, 28, 13 and 18 toward the left, so that this part leaves the sleeve 16, and the tools are disengaged in the manner described hereinabove.

Depending on the pitch of the thread the thread rollers G can also be set obliquely with their shafts and their gear wheels 4—6. If it is intended to operate with such obliquely disposed tools, it is, of course, necessary to construct the mesh of the gear wheels 3, 4, 5, 6 accordingly.

With the device described the blank is preferably rotated and the device is held stationary. However, it is also possible to operate by maintaining the blank stationary and rotating the device. In that case, however, it is necessary to stop the device upon disengagement in order to set it back.

Figs. 6 and 7 illustrate an embodiment which operates likewise with thread rollers, but here the arrangement is set up in a manner that the device rotates preferably during operation while the blank remains stationary.

The screw is machined by the rollers 39. Each of these rollers is mounted upon an eccentrically journalled shaft 40. 41 are the rollers of the bearing. The eccentric trunnions 42 of the shafts are journalled in a ring 43 and the trunnions 44 in a disc 46 which forms a single piece with the shaft 45. Each of the trunnions 44 has a striker pin 47 disposed eccentrically with respect to axis 48 and engaging grooves 49a of the ring 49 (Fig. 7). Ring 49 is connected by means of bolts 50 to ring 52 which is journalled to shaft 45 by way of the roller bearings 51. The bolts 50 project through the segment shaped slots in ring 52 so that upon loosening the bolts 50 the two rings 49 and 52 can be moved relatively to one another to the extent of the length of the slots.

Ring 52 has a cylindrical extension 53. A path in the form of a helical slot 54 is provided in this extension. The path begins at the extreme edge of the cylinder 53 and ends in a stop parallel to the axis T of the shaft 45.

A pin 56 formed as an integral part of a sleeve 58 is engaged by the helical path 54, the sleeve 58 being adapted for axial displacement by a key 57 and a slot 57a. In the embodiment illustrated two similar helical slots 54 are provided on opposite walls of the cylinder 53, although the device can be constructed with only one such slot. The left end of the sleeve 58 is formed in the shape of a ring 59 in which a circumferential groove is provided. Segments 60 which are disposed in this groove are provided with trunnions 61 under control of an adjusting member 62.

Similarly to the arrangement according to the first embodiment a scale 63 is provided around the periphery of disc 49 which can be read by means of index line 64 on disc 52.

Also in this embodiment the disengagement is obtained by turning the eccentric shafts 44 carrying the rollers when the disc 52 is rotated with respect to shaft 45, which causes the rollers 39 to be displaced radially. This displacement is effected by the pin 56 on sleeve 58. Thus, if the sleeve 58 is moved in the direction of the arrow 65 the disc 52 turns on roller bearing 51 with respect to shaft 45 by virtue of the guide 54 and carries along the disc 49 by means of bolts 50. However, since the trunnions 44 are journalled in a flange 46 forming an integral unit with shaft 45 or rigidly connected thereto and since pins 47 of trunnions 44 engage slots 49a in disc 49 the pins 47 thus engaging slots 49a rotate and thereby rotate the eccentric shaft 40. This disengages the tool. After the disengagement the disc 52 may be returned to the starting position by movement of sleeve 58 in the opposite direction.

The disengagement means provided by means of trunnion 61 can be of any desired construction. In the embodiment according to Fig. 7 this trunnion is connected with a lever 67 so that the device can also be manually adjusted while shaft 45 is rotating, for the segments 60 are free to move in the groove on ring 59. Lever 67 may, however, be arranged to operate under the control of a stop; for example, it may be connected to a slide which is guided in any desired manner known per se in a relationship depending on the length of a thread cut into the blank.

Having thus described and ascertained the nature of my invention and the manner in which it is to be performed, what I claim is:

1. A device for cutting screw threads by means of pressing rollers comprising the combination of a first part including a plurality of rollers supported at both ends in parallel discs by roller shafts having eccentrically disposed portions, and a second part including a hollow shaft supporting adjacent one end thereof an intermediate member operatively engaging cooperating members on said roller shafts and adapted in response to rotation of said first part to rotate said roller shafts and displace said rollers radially, an operating sleeve disposed around said hollow shaft and movable axially thereon by the work blank to permit rotary movement of said first part relative to said intermediate member, a spring supported against one end of said sleeve and against said hollow shaft and extending therebetween and an adjustable annular disc associated with said hollow shaft and said intermediate member to adjust the operative position of said rollers with respect to the axis of said work blank and said hollow shaft, said first part including a first detent member, and said second part including a second detent member supported by said sleeve and movable therewith and adapted to engage said first detent member and an adjustable abutment member for rolled blanks secured to the other end of said sleeve and extending into the other end of said hollow shaft and being axially movable by said blanks to disengage said detents, and a coupling spring extending between said first part and said second part adapted to rotate said first part relative to said second part upon disengagement of said detents, thereby causing said radial movement of said rollers.

2. A device for cutting screw threads by means of pressing rollers comprising the combination of a first part including a plurality of rollers supported at both ends in parallel discs by roller shafts having eccentrically disposed portions, and a second part including a hollow shaft supporting adjacent one end thereof an intermediate member operatively engaging cooperating members on said roller shafts and adapted in response to rotation of said first part to rotate said roller shafts and displace said rollers radially, an operating sleeve disposed around said hollow shaft and movable axially thereon by the work blank to permit rotary movement of said first part relative to said intermediate member, an adjustable annular disc associated with said hollow shaft and said intermediate member to adjust the operative position of said rollers with respect to the axis of said work blank and said hollow shaft, and externally adjustable abutment means extending into said hollow shaft through the other end thereof and supported by said sleeve for engagement by the end of the work blank; a pair of cooperating detents one secured to said first part and the other to said sleeve, and a spring associated with said first part and said second part and disposed therebetween, whereby axial movement of said abutment means moves said sleeve and disengages said detents and said spring rotates said first part to move said rollers radially and release the work blank.

FERENC ERDÉLYI.

References Cited in the file of this patent

UNITED STATES PATENTS

| Number | Name | Date |
| --- | --- | --- |
| 885,068 | Moy et al. | Apr. 21, 1908 |
| 948,889 | Landis | Feb. 8, 1910 |
| 1,689,768 | Breitenstein | Oct. 30, 1928 |
| 1,766,598 | Bysshe et al. | June 24, 1930 |
| 1,846,296 | Williamson | Feb. 23, 1932 |
| 1,880,742 | Bosworth | Oct. 4, 1932 |